(12) United States Patent
Hoshino

(10) Patent No.: US 7,277,247 B2
(45) Date of Patent: Oct. 2, 2007

(54) LIBRARY APPARATUS AND CARTRIDGE THEREFOR

(75) Inventor: Keisuke Hoshino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/212,286

(22) Filed: Aug. 26, 2005

(65) Prior Publication Data

US 2006/0262447 A1 Nov. 23, 2006

(30) Foreign Application Priority Data

May 19, 2005 (JP) .............................. 2005-147344

(51) Int. Cl.
*G11B 15/18* (2006.01)
(52) U.S. Cl. ...................................................... 360/69
(58) Field of Classification Search .................... None
See application file for complete search history.

(56) References Cited

U.S. PATENT DOCUMENTS

| | | | | |
|---|---|---|---|---|
| 3,713,133 A | * | 1/1973 | Nathans | 340/531 |
| 4,800,361 A | * | 1/1989 | Greif | 340/426.34 |
| 4,928,245 A | * | 5/1990 | Moy et al. | 700/218 |
| 5,303,214 A | * | 4/1994 | Kulakowski et al. | 369/30.3 |
| 5,361,070 A | * | 11/1994 | McEwan | 342/21 |
| 5,422,744 A | * | 6/1995 | Katz et al. | 359/2 |
| 5,434,737 A | * | 7/1995 | Miura | 360/133 |
| 5,971,281 A | * | 10/1999 | Frary et al. | 235/487 |
| 6,141,730 A | * | 10/2000 | Nishiumi et al. | 711/115 |
| 6,676,026 B1 | * | 1/2004 | McKinley et al. | 236/49.3 |
| RE38,967 E | * | 2/2006 | Kreuzer et al. | 369/21 |
| 2006/0215302 A1 | * | 9/2006 | Murakami | 360/69 |

FOREIGN PATENT DOCUMENTS

| | | | |
|---|---|---|---|
| GB | 2286501 A | * | 8/1995 |
| JP | 3380694 | | 12/2002 |

* cited by examiner

*Primary Examiner*—K. Wong
(74) *Attorney, Agent, or Firm*—Greer, Burns & Crain, Ltd.

(57) ABSTRACT

A library apparatus includes an enclosure enclosing at least a storage cabinet. A sound sensor is located within the enclosure. The sound sensor is designed to detect sound within the enclosure. The library apparatus enables detection of sound inside the enclosure of the library apparatus. A fall of the cartridge can immediately be determined based on the detected sound, for example. If the directivity of the sound sensor has a wider range, the sound sensor is capable of reliably detecting sound caused within the entire enclosure. The sound sensor contributes to a reliable detection of a fall of the cartridge with a simplified structure as compared with an image sensor having a narrower coverage.

17 Claims, 7 Drawing Sheets

LIBRARY APPARATUS AND CARTRIDGE THEREFOR

BACKGROUND OF THE INVENTION

1. Field of the Invention

The present invention relates to a library apparatus designed to hold recording media such as magnetic tape cartridges within cells defined in a storage cabinet, for example.

2. Description of the Prior Art

A magnetic tape library apparatus is generally known, for example, as disclosed in Japanese Patent 3380694. Such a magnetic tape library apparatus includes cabinet storages each defining cells. The individual cell contains a magnetic tape cartridge. A self-propelled carrier robot transports the magnetic tape cartridge between a magnetic tape drive and the individual cell.

Now, assume that an earthquake causes the magnetic tape cartridge to fall off the cell. When the magnetic tape cartridge falls into the movement path of the carrier robot, the magnetic tape cartridge gets run over by the carrier robot in some cases. This results in damage to the magnetic tape cartridge. Once such a magnetic tape cartridge gets damaged, it cannot easily be repaired, so that information recorded in the magnetic tape cartridge is lost. When the magnetic tape cartridge has fallen off, it is desirable to stop the carrier robot as soon as possible. A conventional magnetic tape library apparatus is allowed to notice the fall of the magnetic tape cartridge only when the carrier robot accesses the cell, as disclosed in Japanese Patent 3380694.

SUMMARY OF THE INVENTION

It is accordingly an object of the present invention to provide a library apparatus capable of immediately detecting a fall of a magnetic tape cartridge in a facilitated manner. It is an object of the present invention to provide a cartridge and a method of controlling the magnetic library apparatus greatly contributing to realization of such a library apparatus. In addition, it is an object of the present invention to provide a library apparatus reliably detecting abnormality within the enclosure of the library apparatus.

According to a first aspect of the present invention, there is provided a library apparatus comprising: an enclosure enclosing at least a storage cabinet; and a sound sensor located within the enclosure, said sound sensor detecting sound within the enclosure.

The library apparatus enables detection of sound inside the enclosure of the library apparatus. A fall of the cartridge can immediately be determined based on the detected sound, for example. If the directivity of the sound sensor has a wider range, the sound sensor is capable of reliably detecting sound caused within the entire enclosure. The sound sensor contributes to a reliable detection of a fall of the cartridge with a simplified structure as compared with an image sensor having a narrower coverage.

The library apparatus may further comprise: a cartridge located in the storage cabinet, said cartridge enclosing the sound sensor; a memory incorporated in the cartridge, said memory holding type data specifying type of the cartridge; a storage battery incorporated in the cartridge; a battery charger supplying electricity to the storage battery based on electromagnetic induction; and a controller incorporated in the battery charger, said controller gaining the type data from the memory unit. The library apparatus enables determination of the type of the cartridge prior to start of the charge. Accordingly, the battery charger is allowed to act only on the cartridge enclosing the storage battery. Cartridges that fail to enclose a storage battery are prevented from exposure to irradiation of electromagnetic waves. The cartridges are in this manner sufficiently protected from exposure to electromagnetic waves.

According to a second aspect of the present invention, there is provided a method of controlling a library apparatus, comprising: detecting sound in an enclosure of the library apparatus; and determining a fall of a cartridge from a storage cabinet in the enclosure based on the sound. The method enables a reliable and immediate detection of a fall of the cartridge based on the detected sound. The method may further comprise capturing an image of the inside of the enclosure in response to the fall of the cartridge. A fall of the cartridge can be determined with a higher accuracy based on the captured image.

According to a third aspect of the present invention, there is provided a cartridge for a library apparatus, comprising: a cartridge casing; and a sound sensor enclosed within the cartridge casing. The cartridge can easily be incorporated within the library apparatus. The aforementioned library apparatus can be realized in a facilitated manner.

According to a fourth aspect of the present invention, there is provided a library apparatus comprising: an enclosure enclosing at least a storage cabinet; and an ultrasonic sensor located inside the enclosure, said ultrasonic sensor designed to detect the movement of an object based on the reflection of an ultrasonic. The library apparatus allows a reliable and immediate detection of a fall based on the action of the ultrasonic sensor. Otherwise, the ultrasonic sensor contributes to capture of an image of a person who enters the library apparatus without permission. Here, there may be provided a cartridge for a library apparatus, comprising: a cartridge casing; and an ultrasonic sensor located inside the cartridge casing. This type of cartridge allows establishment of the aforementioned library apparatus in a facilitated manner.

According to a fifth aspect of the present invention, there is provided a method of controlling a library apparatus, comprising: detecting the movement of an object in an enclosure of the library apparatus based on the reflection of an ultrasonic; and capturing an image of the inside of the enclosure based on the movement of the object. This type of method enables an immediate detection of a fall of the cartridge. Otherwise, images may be captured in the library apparatus in response to the detection of the movement of an object. The capture of the image in this manner is expected to contribute to identification of a person removing the cartridge, for example.

According to a sixth aspect of the prevent invention, there is provided a library apparatus comprising: an enclosure enclosing at least a storage cabinet; and a temperature sensor located inside the enclosure, said temperature sensor detecting temperature inside the enclosure. The library apparatus of the type enables an immediate detection of the temperature inside the enclosure. The cartridge in the library apparatus can be protected from an excessively high temperature. Here, there may be provided a cartridge for a library apparatus, comprising: a cartridge casing; and a temperature sensor located inside the cartridge casing. The cartridge of the type allows establishment of the aforementioned library apparatus in a facilitated manner.

According to a seventh aspect of the present invention, there is provided a library apparatus comprising: an enclosure enclosing at least a storage cabinet; and a humidity sensor located within the enclosure, said humidity sensor detecting the humidity inside the enclosure. The library apparatus enables an immediate detection of the humidity inside the enclosure. The cartridge in the library apparatus can be protected from an excessively high humidity. Here, there may be provided a cartridge for a library apparatus, comprising: a cartridge casing; and a humidity sensor located inside the cartridge casing. The cartridge of the type allows establishment of the aforementioned library apparatus in a facilitated manner.

According to an eighth aspect of the present invention, there is provided a cartridge for a library apparatus, comprising: a cartridge casing; an image sensor located inside the cartridge casing; an optical lens establishing an imaging of an object on the image sensor; and a mirror designed to move between first and second positions, said first position being defined on an optical axis of the optical lens, said second position being defined at a position retreating from the optical axis of the optical lens.

When the mirror is located on the optical axis of the optical lens in the cartridge, the optical axis of the optical lens is refracted based on the reflection on the mirror. When the mirror recedes from the optical axis of the optical lens, the optical axis of the optical lens extends straight. The image sensor is allowed to have a wider coverage. An image can be captured in the library apparatus for a detailed situation.

According to a ninth aspect of the present invention, there is provided a cartridge for a library apparatus, comprising: a cartridge casing; first and second image sensors located inside the cartridge casing; a first optical lens leading an image of an object to the first image sensor in a first direction; and a second optical lens leading an image of an object to the second image sensor in a second direction opposite to the first direction.

The combination of the first image sensor and optical lens or the combination of the second image sensor and optical lens can selectively be employed in the cartridge. The cartridge allows the capture of an image of an object located outward in the first direction and the capture of an image of an object located outward in the second direction.

The cartridge of the type may further comprise a controller designed to detect an object approaching the cartridge casing in the first direction. The detection of the object in this manner may be utilized to change over the first image sensor and the second image sensor for capturing an image.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
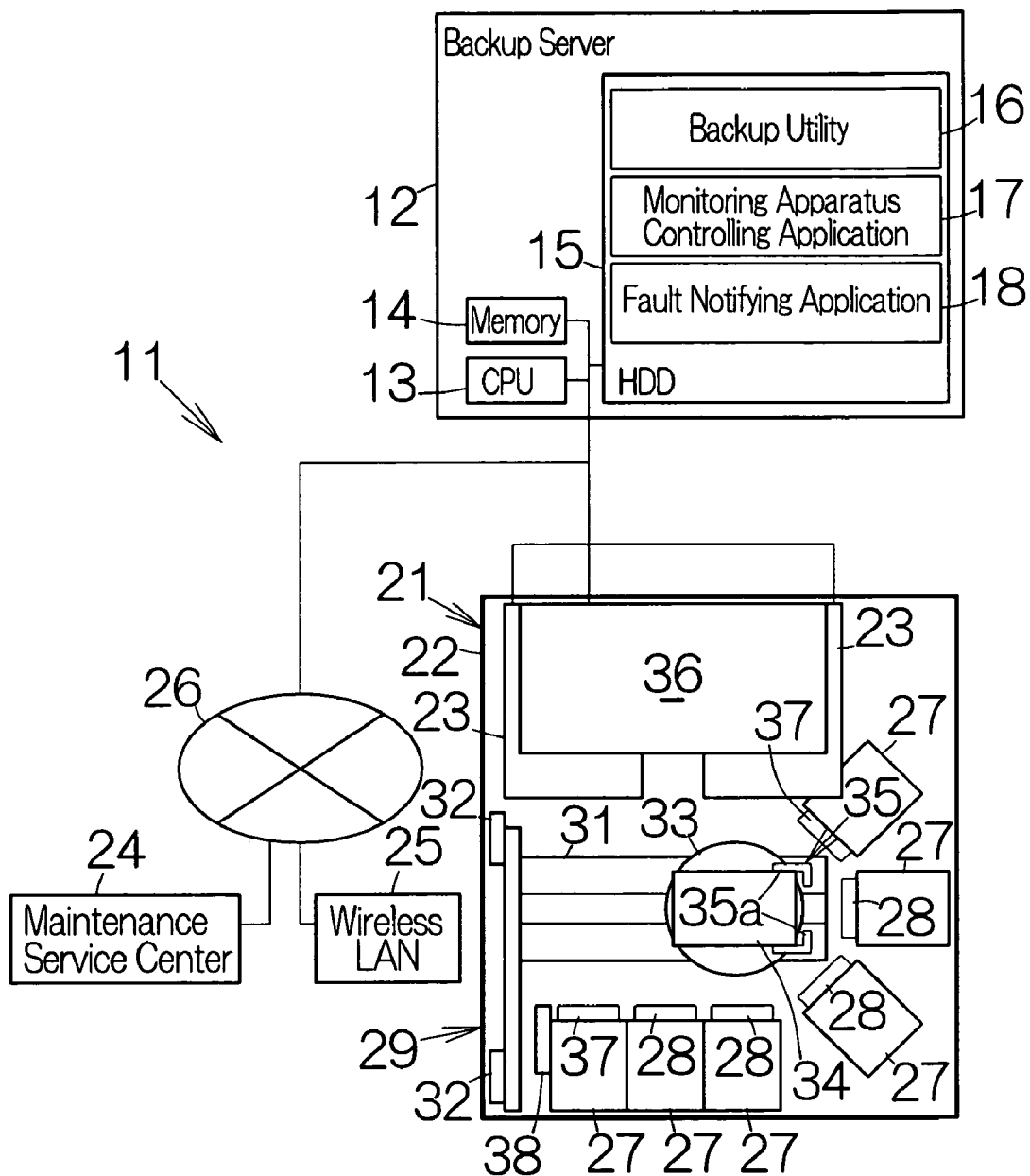
FIG. 1 is a block diagram schematically illustrating an example of a data backup system.

FIG. 1 schematically illustrates an example of a data backup system 11. The data backup system 11 includes a backup server 12, for example. A central processing unit, CPU, 13, a memory 14, and a mass storage or hard disk drive (HDD) 15 are incorporated within the backup server 12 in the same manner as a general server computer. The hard disk drive 15 contains software programs such as a conventional backup utility 16, a monitoring apparatus controlling application 17, a fault notifying application 18. The central processing unit 13 implements the software programs 16, 17, 18 so as to realize the backup of the data. The software programs 16, 17, 18 are temporarily stored in the memory 14, for example. The software programs 16, 17, 18 will be described later in detail.

A magnetic tape library apparatus 21, as an example of a library apparatus according to the present invention, is connected to the backup server 12. The magnetic tape library apparatus 21 includes a box-shaped enclosure 22. The enclosure 22 defines an inner space of a parallelepiped standing upright from the floor, for example. A recording medium drive or drives, namely a magnetic tape drive or drives 23, is placed within the enclosure 22. The magnetic tape drive 23 is capable of receiving insertion of a cartridge, for example. The magnetic tape drive 23 is utilized to write and read magnetic data into and from the magnetic tape within the magnetic tape cartridge. Instruction signals are supplied to the magnetic tape drive 23 from the central processing unit 13 of the backup server 12 when the magnetic tape drive 23 writes and reads the magnetic data. The instruction signals are generated based on the implementation of the backup utility 16, for example. The magnetic tape cartridge is inserted into or discharged out of the magnetic tape drive 23 through a slot. The magnetic tape of the magnetic tape cartridge is first reeled off from the reel within the magnetic tape cartridge. The magnetic tape is then wound around the reel of the magnetic tape drive 23. A linear tape-open (LTO) cartridge may be employed as the magnetic tape cartridge, for example.

A maintenance service center 24 and a wireless local area network, LAN, 25 are connected to the backup server 12. The Internet and the other networks 26 may be employed to establish the connection. Predetermined signals are exchanged between the backup server 12 and the maintenance service center 24 as well as between the backup server 12 and the wireless LAN 25. The wireless LAN 25 includes an access point, not shown, for example. Predetermined signals are exchanged between the access point and LAN terminals located over an area surrounding the access point.

Figure 2:
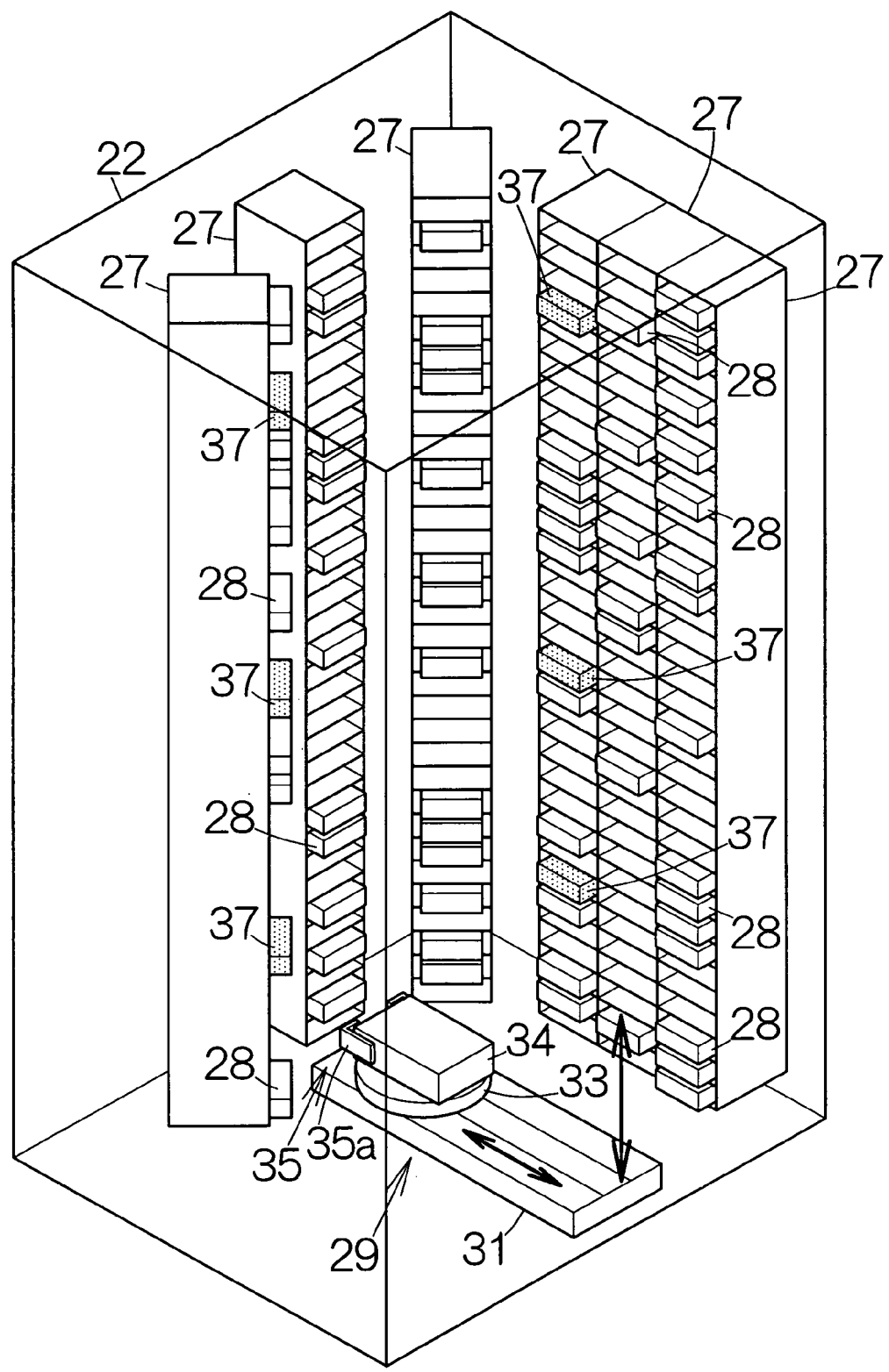
FIG. 2 is a perspective view schematically illustrating the inner structure of a magnetic tape library apparatus.

Referring also to FIG. 2, storage cabinets 27 are placed within the inner space of the enclosure 22 in the magnetic tape library apparatus 21. The individual storage cabinet 27 defines cells. Each cell is allowed to hold a recording medium such as a magnetic tape cartridge, for example. The cells in each storage cabinet 27 are arranged in a vertical direction upright to the floor.

A carrier robot 29 is also placed within the inner space of the enclosure 22. The carrier robot 29 includes a horizontal rail 31 extending in a horizontal direction in parallel with the floor. The horizontal rail 31 is coupled to a pair of support columns 32 standing upright from the floor. The horizontal rail 31 is allowed to move in a vertical direction along the support columns 32. The horizontal rail 31 is always kept in a horizontal attitude during the vertical movement. The horizontal rail 31 in this manner moves within a movement space. The magnetic tape drive 23 is designed to direct the slots into the movement space. The storage cabinets 27 are likewise designed to direct the openings of the cells into the movement space.

A drive mechanism, not shown, is connected to the horizontal rail 31 so as to realize the vertical movement of the horizontal rail 31. The drive mechanism may include a belt coupled to the horizontal rail 31 at the tip end, and a hoist designed to wind up the belt, for example. A power source such as an electric motor is incorporated in the hoist, for example. A servomotor may be utilized as the electric motor, for example.

A mobile unit 33 is mounted on the horizontal rail 31. The mobile unit 33 is allowed to move in a horizontal direction along the horizontal rail 31. A drive mechanism, not shown, is connected to the mobile unit 33 so as to realize the horizontal movement of the mobile unit 33. The drive mechanism may include an endless belt wound around a pair of pulleys on the horizontal rail 31, and a power source establishing a driving force to drive one of the pulleys for rotation, for example. The endless belt may be coupled to the mobile unit 33. An electric motor may be utilized as the power source. A servomotor may be utilized as the electric motor, for example.

A grasping mechanism or hand 34 is mounted on the mobile unit 33 for relative rotation around a vertical axis. A drive mechanism, not shown, is connected to the hand 34 so as to realize the rotation of the hand 34. The drive mechanism may include an endless belt wound around a pulley on the mobile unit 33, and a power source establishing a driving force to drive the pulley for rotation, for example. An electric motor may be utilized as the power source. A servomotor may be utilized as the electric motor, for example.

The hand 34 includes a pair of claws 35a, 35a extending forward from the enclosure of the hand 34. The claws 35a, 35a are allowed to get opposed to the opening of a specific slot or cell through the vertical movement of the horizontal rail 31, the horizontal movement of the mobile unit 33, and the rotation of the hand 34. The claws 35a move between first and second positions. The claws 35a at the first positions are spaced from each other by a first distance in the horizontal direction. The claws 35a at the second positions are spaced from each other by a second distance larger than the first distance in the horizontal direction. When the claws 35a are located at the first positions, a space is defined between the claws 35a, 35a for allowing the magnetic tape cartridge 28 to pass through. When the claws 35a are located at the second positions, the magnetic tape cartridge 28 is caught between claws 35a. The magnetic tape cartridge 28 is in this manner held in the grasping mechanism or hand 34.

A drive mechanism, not shown, is connected to the claws 35a so as to realize the movement of the claws 35a. A so-called rack-and-pinion mechanism may be employed as the drive mechanism, for example. A specific power source may be connected to the pinion of the rack-and-pinion mechanism. An electric motor may be employed as the power source. A servomotor may be utilized as the electric motor, for example. The claws 35a, 35a are designed to move in the longitudinal direction along a guide rail, not shown, incorporated in the hand 34. A drive mechanism is connected to the claws 35a so as to realize the movement of the claws 35a in the longitudinal direction. A so-called rack-and-pinion mechanism may be employed as the drive mechanism as well.

As shown in FIG. 1, a controller 36 is placed within the inner space of the enclosure 22. The controller 36 is designed to control the vertical movement of the horizontal rail 31, the horizontal movement of the mobile unit 33, the rotation of the hand 34 and the movement of the claws 35a. Instruction signals are supplied to the controller 36 from the central processing unit 13 within the backup server 12 for the control of the aforementioned movements and rotation. The instruction signals are generated based on the execution of the backup utility 16, for example. The controller 36 serves to direct the claws 35a on the hand 34 to the opening of a specific cell or a slot of the magnetic tape drive 23. The carrier robot 29 transfers the magnetic tape cartridge 28 between the cell and the magnetic tape drive 28.

A monitoring apparatus unit 37 is held in a specific cell defined in the storage cabinet 27. The monitoring apparatus unit 37 is formed in a shape identical to that of the magnetic tape cartridge 28. Accordingly, the cell is allowed to receive the insertion of the monitoring apparatus unit 37. Besides, the claws 35a on the hand 34 are allowed to hold the monitoring apparatus unit 37 therebetween. The monitoring apparatus unit 37 continuously monitors any change happening in the enclosure 22. The monitoring apparatus unit 37 will be described later in detail. At least one monitoring apparatus unit 37 may be placed in the enclosure 22 of the magnetic tape library apparatus 21.

A battery charger 38 is placed adjacent to a specific cell defined in the storage cabinets 27. The battery charger 38 is capable of electrifying the monitoring apparatus unit 37 held in the specific cell. The battery charger 38 will be described later in detail.

Figure 3:
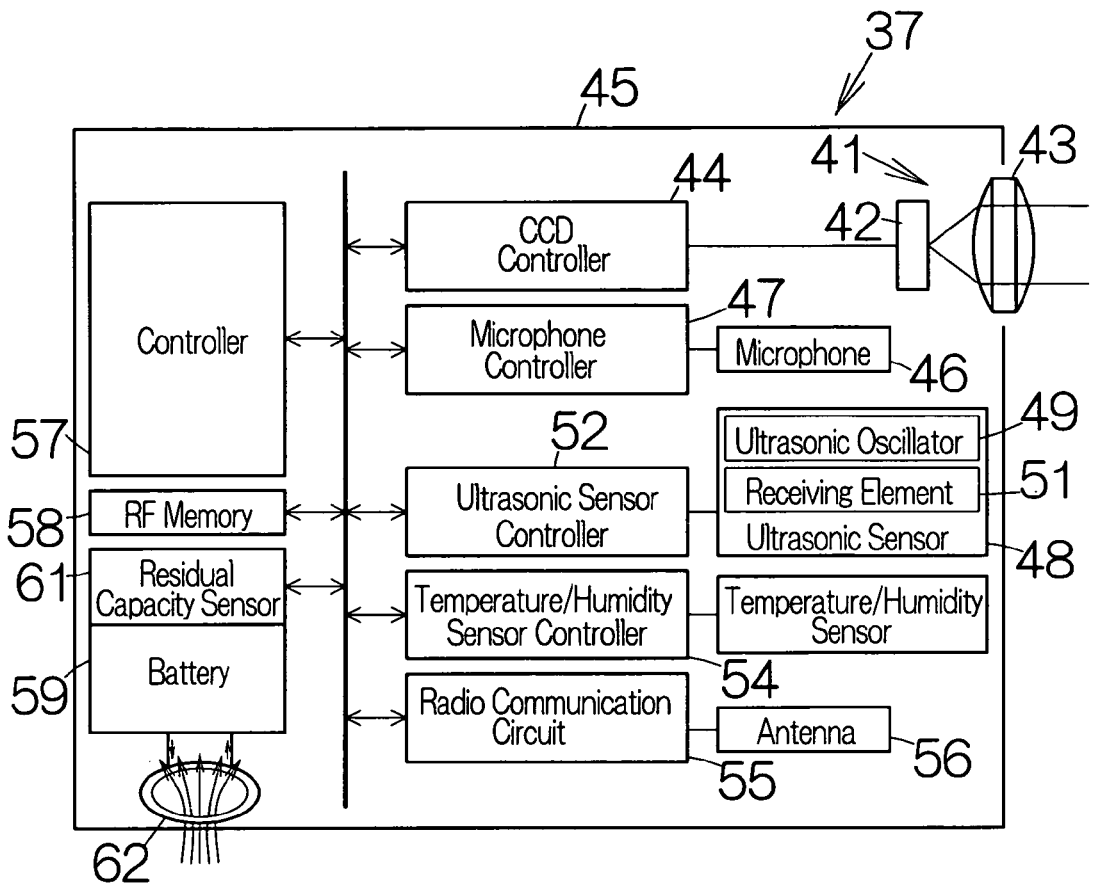
FIG. 3 is a block diagram schematically illustrating the structure of a monitoring apparatus unit.

Here, a detailed description will be made on the structure of the monitoring apparatus unit 37. As shown in FIG. 3, the monitoring apparatus unit 37 includes a charge-coupled device (CCD) camera 41. The CCD camera 41 includes a CCD 42 and an optical lens 43 coupled to the CCD 42. The optical lens 43 serves to establish a focused image of an object on the CCD 42. A CCD controller 44 is connected to the CCD 42. The CCD controller 44 controls the CCD camera 41 for the capture of an image. The CCD controller 44 generates an image information signal specifying the image of an object. The CCD camera 41 may be placed within the cartridge casing 45 of the monitoring apparatus unit 37. As described above, the cartridge casing 45 may have a shape identical to that of the magnetic tape cartridge 28.

The monitoring apparatus unit 37 also includes a microphone 46 within the cartridge casing 45. The microphone 46 detects sound of the surroundings. The microphone 46 serves as a sound sensor according to the prevent invention. A microphone controller 47 is connected to the microphone 46. The microphone controller 47 serves to detect an abnormal sound in the enclosure 22. The microphone controller 47 is designed to compare the volume level of the sound detected at the microphone 46 with a threshold so as to detect an abnormal sound. A filtering treatment is applied to the detected sound prior to the comparison. The filtering treatment functions to remove from the detected sound a component corresponding to the sound of the movement of the carrier robot 29. The volume level is thus detected regarding the sound excluding the sound of the movement of the carrier robot 29. When the volume level exceeds the threshold in the comparison, the microphone controller 47 generates a predetermined notification signal. The detected sound itself, such as a frequency data, is included in the notification signal.

An ultrasonic sensor 48 is also placed in the cartridge casing 45 of the monitoring apparatus unit 37. The ultrasonic sensor 48 includes an ultrasonic oscillator 49 and a receiving element 51. The ultra sonic oscillator 49 transmits ultrasonics. The receiving element 51 is designed to receive ultrasonics. The ultrasonic sensor 48 detects movement of an object based on the ultrasonics reflected from the object. An ultrasonic sensor controller 52 is connected to the ultrasonic sensor 48. The ultrasonic sensor controller 52 controls the operation of the ultrasonic sensor 48. The ultrasonic sensor controller 52 is designed to generate, based on the detected movement of the object, a movement information signal specifying the movement of an object.

A temperature/humidity sensor 53 is also placed in the cartridge casing 45 of the monitoring apparatus unit 37. The temperature/humidity sensor 53 detects the temperature and humidity in the space inside the enclosure 22. A temperature/humidity sensor controller 54 is connected to the temperature/humidity sensor 53. The temperature/humidity sensor controller 54 generates a temperature information signal and a humidity information signal based on the temperature and humidity detected at the temperature/humidity sensor 53. The temperature information signal specifies the temperature within the enclosure 22. The humidity information signal likewise specifies the humidity within the enclosure 22.

A radio communication circuit 55 is also placed in the cartridge casing 45 of the monitoring apparatus unit 37. Radio signals are exchanged between the radio communication circuit 55 and the access point of the wireless LAN 25. An antenna 56 is connected to the radio communication circuit 55 so as to transmit and receive radio signals. The radio signals are exchanged between the antenna 56 and the access point of the wireless LAN 25.

A controller 57 is placed in the cartridge casing 45 of the monitoring apparatus unit 37. The controller 57 is designed to control the operation of the CCD controller 44, the microphone controller 47, the ultrasonic sensor controller 52, and the temperature/humidity sensor controller 54. The controller 57 allows the radio communication circuit 55 to transmit to the access point of the wireless LAN 25 the image information signal of the CCD controller 44, the notification signal of the microphone controller 47, the movement information signal of the ultrasonic sensor controller 52, and the temperature information signal and the humidity information signal of the temperature/humidity sensor controller 54.

A radio-frequency (RF) memory 58 is also placed in the cartridge casing 45 of the monitoring apparatus unit 37. The radio-frequency memory 58 holds a cartridge type data and an identification information data. The cartridge type data specifies the identification distinguishing the monitoring apparatus units 37 from the magnetic tape cartridges 28. The cartridge type data may commonly be set for all of the monitoring apparatus units 37. The identification information data specifies an identification, such as a serial number, unique to the individual monitoring apparatus unit 37, for example. The identification information data is utilized to distinguish the individual monitoring apparatus units 37 from each other. The battery charger 38 is utilized to read the cartridge type data as described later in detail. The identification information data may be stored in a random access memory, RAM, incorporated in the controller 57, for example. A so-called cartridge memory, CM, according to the LTO standard may be employed as the RF memory 58. Otherwise, a so-called IC tag may be employed as the RF memory 58.

A battery 59 is further placed in the cartridge casing 45 of the monitoring apparatus unit 37. The battery 59 is categorized into a so-called storage battery or secondary battery. The battery 59 supplies electric power to the controllers 57, 44, 47, 52, 54, the CCD camera 41, the microphone 46, the ultrasonic sensor 48, the temperature/humidity sensor 53, and the like.

A residual capacity sensor 61 is attached to the battery 59. The residual capacity sensor 61 is designed to detect the residual capacity of the battery 59. When the residual capacity of the battery 59 falls below a threshold, the residual capacity sensor 61 outputs a predetermined notification signal.

A coil 62 is connected to the battery 59. When magnetic flux acts on the coil 62, electric current is induced in the coil 62. The induced electric current is utilized to charge the battery 59.

Figure 4:
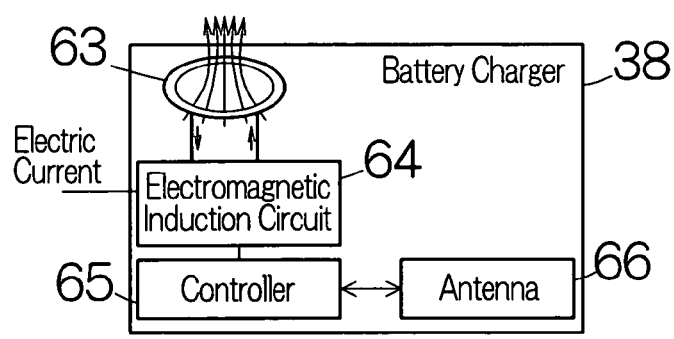
FIG. 4 is a block diagram schematically illustrating the structure of a battery charger.

Next, a detailed description will be made on the structure of a battery charger 38. As shown in FIG. 4, the battery charger 38 includes a coil 63. An electromagnetic induction circuit 64 is connected to the coil 63. Electric current is supplied from the electromagnetic induction circuit 64 to the coil 63. The supplied electric current generates magnetic field in the coil 63. When the magnetic field generated in the coil 63 is applied to the coil 62 placed in the monitoring apparatus unit 37, the battery 59 is charged up in the monitoring apparatus unit 37.

A controller 65 is connected to the electromagnetic induction circuit 64. The controller 65 is designed to control the supply of the electric current and the amount of the electric current for the coil 63. An antenna 66 is connected to the controller 65. The antenna 66 serves to allow the controller 65 to communicate with the RF memory 58 placed in the monitoring apparatus unit 37. The controller 65 is thus allowed to gain the cartridge type data stored in the RF memory 58.

The magnetic tape library apparatus 21 receives data from a server, not shown, connected to the magnetic tape library apparatus 21 during the execution of the backup utility 16. The data is written into a magnetic tape cartridge in the magnetic tape drive 23. The data is in this manner backed up. A specific magnetic tape cartridge 28 is transferred from the cell to the magnetic tape drive 23 in accordance with the instruction signal from the central processing unit 13 based on the backup utility 16. The magnetic tape cartridge 28 can be identified based on a bar code label attached on the outer surface of the magnetic tape cartridge 28. An identifier unique to the magnetic tape cartridge 28 is read out of the bar code label. The identifier may correspond to the cell number assigned to each of the cells, for example.

When the data has fully been recorded in the entire magnetic tape in the magnetic tape cartridge 28, the central processing unit 13 realizes exchange of the magnetic tape cartridges 28 in accordance with the backup utility 16. The controller 36 operates to allow the claws 35*a* of the carrier robot 29 to get opposed to the slot of the magnetic tape drive 23. The carrier robot 29 allows the vertical movement of the horizontal rail 31, the horizontal movement of the mobile unit 33, and the rotation of the hand 34. When the magnetic tape cartridge 28 is discharged from the magnetic tape drive 23, the claws 35*a* catch the magnetic tape cartridge 28 in the aforementioned manner.

The carrier robot 29 then transfers the magnetic tape cartridge 28 to the designated cell. The controller 36 operates to allow the magnetic tape cartridge 28 on the hand 34 to get opposed to the opening of the designated cell. The carrier robot 29 realizes the vertical movement of the horizontal rail 31, the horizontal movement of the mobile unit 33, and the rotation of the hand 34. The magnetic tape cartridge 28 is thus inserted into the designated cell. When the magnetic tape cartridge 28 is completely contained within the designated cell, the claws 35*a* retreat from the magnetic tape cartridge 28.

Next, a detailed description will be made on the action of the monitoring apparatus controlling application 17. The monitoring apparatus controlling application 17 accepts registration of the positions of the individual monitoring apparatus units 37. In this case, the address of cells, namely the cell numbers, are related to the individual monitoring apparatus units 37. Here, the identification information data stored in the RF memory 58 is utilized to discriminate the individual monitoring apparatus units 37 from each other. The identification information data and the cell number may be stored in the hard disk drive 15, for example.

Now, assume an abnormal sound is caused within the enclosure 22 during the operation of the monitoring apparatus controlling application 17. When the microphone 46 detects the abnormal sound, a notification signal is generated in the microphone controller 47, as described above. The controller 57 assembles a data signal based on the notification signal and the identification information data. The identification information data is extracted from the RF memory 58. The radio communication circuit 55 serves to transmit the data signal from the antenna 56.

Figure 5:
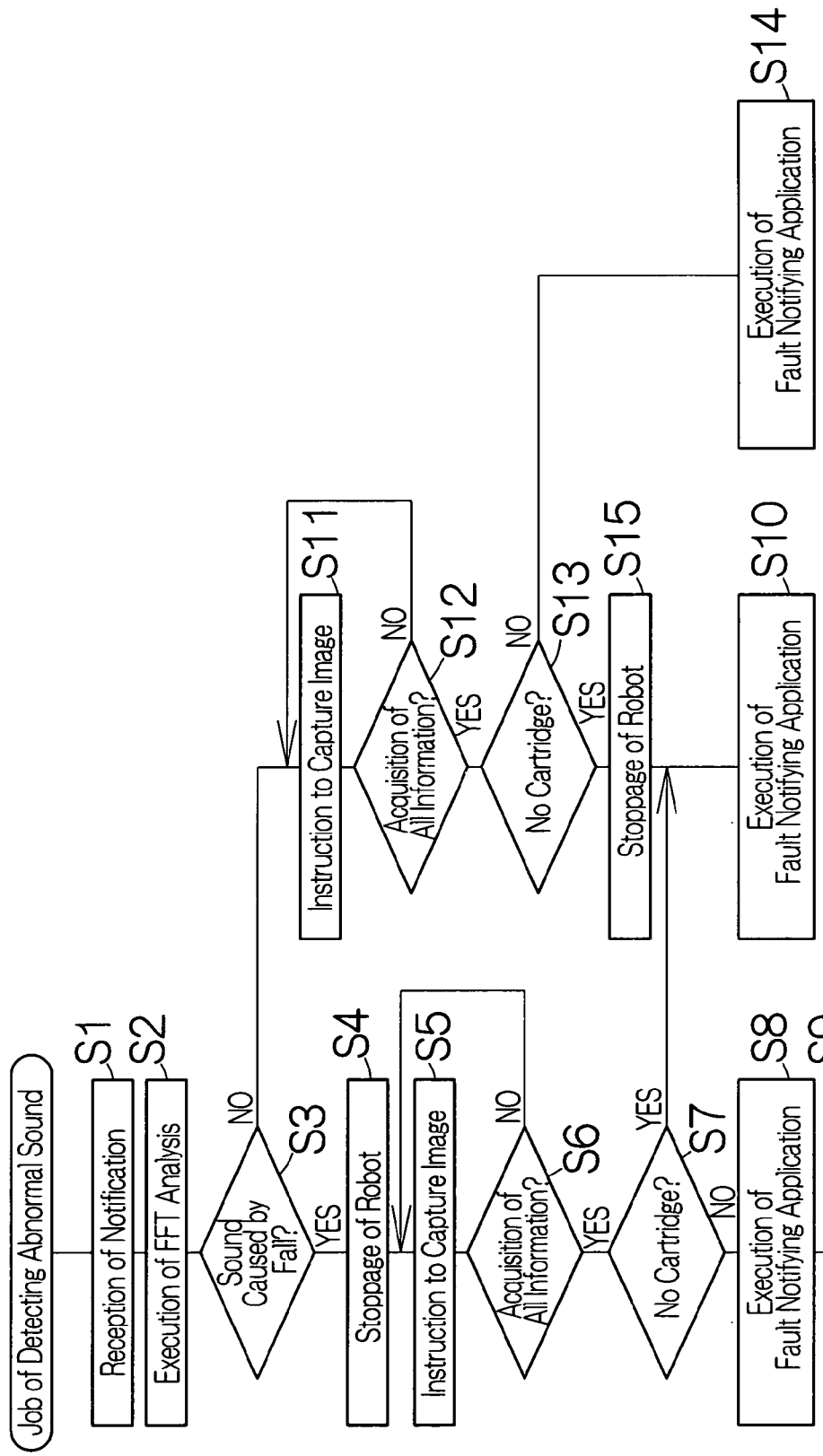
FIG. 5 is a flowchart illustrating processes based on the execution of a monitoring apparatus controlling application when an abnormal sound is detected in the magnetic tape library.

The access point of the wireless LAN 25 receives the transmitted data signal. The data signal is then transferred through the network 26 into the backup server 12. As shown in FIG. 5, the central processing unit 13 of the backup server 12 thus receives the notification signal of the abnormal sound at step S1. The central processing unit 13 then applies the fast Fourier transform, FFT, to the sound included in the notification signal based on the monitoring apparatus controlling application 17 at step S2. The distribution is in this manner analyzed for the frequency of the sound. The analyzed distribution is compared with a predetermined distribution of the frequency at step S3. This predetermined distribution of the frequency may in advance be prepared based on the sound caused by the contact or collision of the magnetic tape cartridge 28. The predetermined distribution of the frequency is stored in the hard disk drive 15, for example. The central processing unit 13 in this manner determines whether or not the detected sound corresponds to a "fall" of the magnetic tape cartridge 28. When the sound is recognized as the "fall", the central processing unit 13 operates to realize stoppage of the carrier robot 29 based on the monitoring apparatus controlling application 17 at step S4. The process of the backup utility 17 is interrupted. The controller 36 of the magnetic tape library apparatus 21 stops the operation of the carrier robot 29.

The central processing unit 13 operates to allow the CCD camera 41 of the monitoring apparatus unit 37 to capture an image at step S5. The instruction signal is transferred to the monitoring apparatus unit 37 through the network 26 and the wireless LAN 25. The controller 57 of the monitoring apparatus unit 37 instructs the CCD controller 44 to operate to capture an image. Here, all the monitoring apparatus units 37 may be instructed to capture images. Alternatively, only some of the monitoring apparatus units 37 may be instructed to capture images. The monitoring apparatus unit 37 is allowed to capture an image over a range determined based on the optical lens 43. The images of cells in the storage cabinets 27 are captured within the range.

When the images have been captured, the CCD controller 44 generates the image information signal. The controller 57 operates to transfer the image information signal to the access point of the wireless LAN 25. In this case, the identification information data is attached to the image information signal. The central processing unit 13 of the backup server 12 receives the image information signal from each of the monitoring apparatus units 37. The central processing unit 13 determines at step S6 whether or not the central processing unit 13 has received all the required information. If not completed, the central processing unit 13 operates to allow capture of images again at step S5. If done, the processing of the central processing unit 13 advances to step S7.

The central processing unit 13 implements an image analysis on image data included in the image information signal at step S7. The image analysis is utilized to determine whether or not the magnetic tape cartridges 28 exist in the cells. If it is confirmed that the magnetic tape cartridge or cartridges 28 exists in the cell or cells corresponding to the registered position or positions, the processing of the central processing unit 13 advances to step S8. The central processing unit 13 implements the fault notifying application 18 at step S8. The central processing unit 13 generates a predetermined notification signal based on the fault notifying application 18. This notification signal is transferred to the maintenance service center 24 through the network 26. The maintenance service center 24 is in this manner notified of the fact that sound was caused without a drop of the magnetic tape cartridge 28 out of the cells. When the notification is in this manner completed, the central processing unit 13 cancels the stoppage of the carrier robot 29. The magnetic tape library apparatus 21 resumes the normal operation of the backup utility 16. The aforementioned image analysis may be implemented based on a conventional image recognition technique.

If the image analysis reveals that the magnetic tape cartridge 28 has been lost, the central processing unit 13 determines a fall of the magnetic tape cartridge 28. The central processing unit 13 implements the fault notifying application 18 at step S10. The maintenance service center 24 is in this manner notified of a fall of the magnetic tape cartridge 28 out of a cell. A maintenance or service person is allowed to rush for the maintenance activity on the magnetic tape library apparatus 21 in response to the notification. Moreover, since the carrier robot 29 stops operating immediately after the sound is caused, the magnetic tape cartridge 28 is reliably prevented from being run over by the carrier robot 29. The magnetic tape cartridge 28 is thus reliably prevented from suffering from heavy damages.

If the central processing unit 13 determines at step S3 that the sound is detected without a drop of the magnetic tape cartridge 28, for example, the central processing unit 13 operates to allow the monitoring apparatus unit 37 to capture images of the cells prior to stoppage of the carrier robot 29. As described above, the image information signal is transferred to the central processing unit 13 from each of the monitoring apparatus units 37. The central processing unit 13 determines at step S12 whether or not the central processing unit 13 has received all the required information. If not completed, the central processing unit 13 operates to realize capture of images again at step S11. If done, the processing of the central processing unit 13 advances to step S13.

The central processing unit 13 then implements an image analysis on image data included in the image information signal at step S13. The image analysis is utilized to determine whether or not the magnetic tape cartridges 28 exist in the cells. If it is confirmed that the magnetic tape cartridge or cartridges 28 exists in the cell or cells corresponding to the registered position or positions, the processing of the central processing unit 13 advances to step S14. The central processing unit 13 implements the fault notifying application 18 at step S14. The maintenance service center 24 is notified of the fact that sound was caused without a drop of the magnetic tape cartridge 28 out of the cells in the aforementioned manner. The backup utility 16 is allowed to keep operating.

If the image analysis reveals that the magnetic tape cartridge 28 has been lost, the central processing unit 13 determines a fall of the magnetic tape cartridge 28. The central processing unit 13 operates to stop the operation of the carrier robot 29 based on the monitoring apparatus controlling application 17 at step 15. The central processing unit 13 then implements the fault notifying application 18 at step S10. The maintenance service center 24 is in this manner notified of a fall of the magnetic tape cartridge 28 out of a cell. A maintenance or service person is allowed to rush for the maintenance activity on the magnetic tape library apparatus 21.

Next, assume that an unidentified object happens to move within the enclosure 12 during the execution of the monitoring apparatus controlling application 17. When an unidentified object passes across the coverage of the ultrasonic sensor 48, the receiver 51 receives the ultrasonics reflected from the object. The ultrasonic sensor controller 52 thus generates the movement information signal. As described above, the controller 57 assembles a data signal based on the movement information signal and the identification information data. The assembled data signal is transferred through the antenna 56 to the access point of the wireless LAN 25. The assembled data signal is then transferred through the network 26 into the backup server 12.

Figure 6:
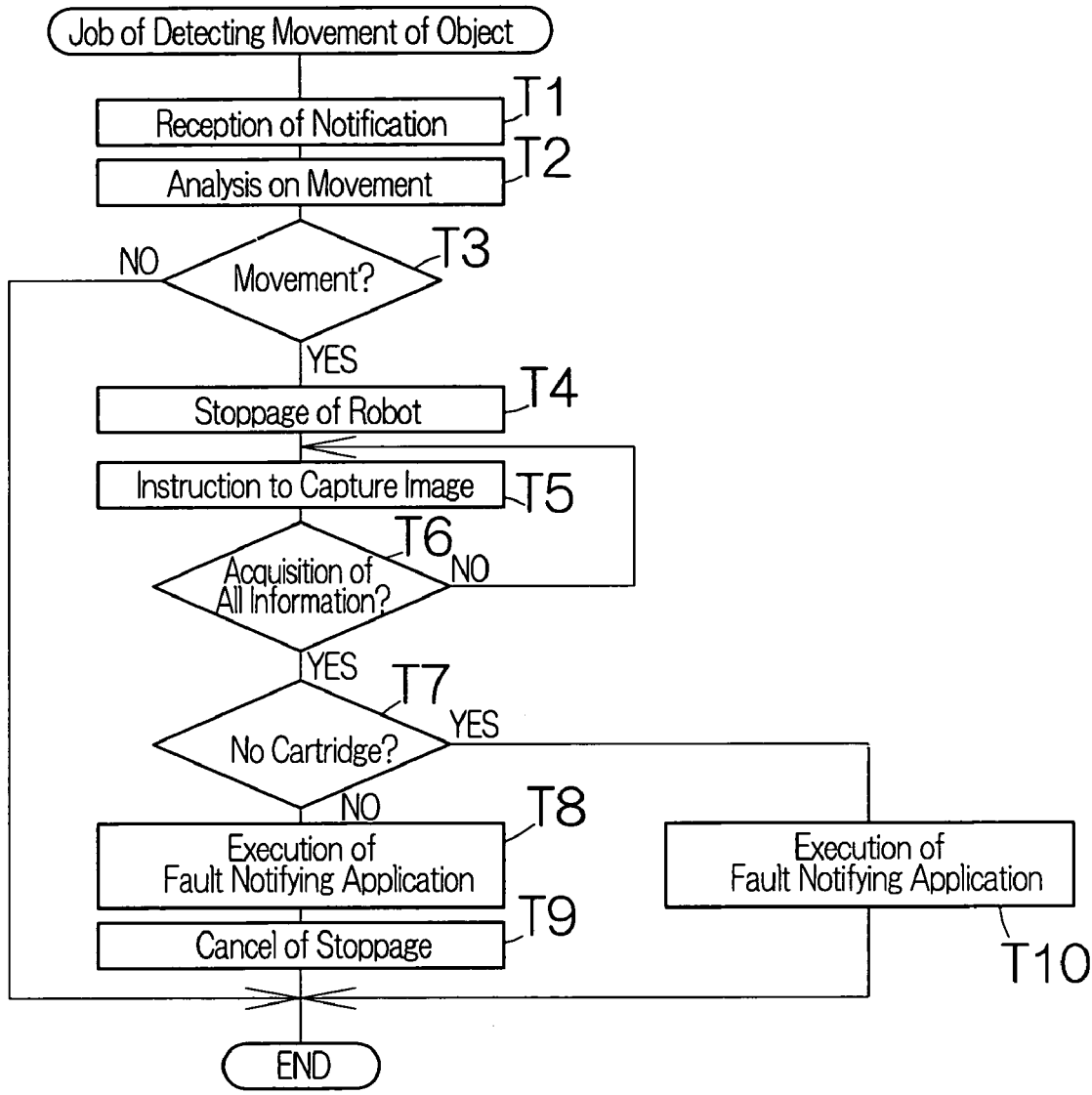
FIG. 6 is a flowchart illustrating processes based on the monitoring apparatus controlling application when the movement of an unidentified object is detected in the magnetic tape library.

As shown in FIG. 6, when the central processing unit 13 of the backup server 12 receives the movement information signal at step T1, the central processing unit 13 starts analyzing the movement of the object included in the movement information signal based on the monitoring apparatus controlling application 17. The central processing unit 13 makes reference to the movement path of the carrier robot 29 recorded at the time when the object moves. The movement path of the carrier robot 29 may be kept in the hard disk drive 15 for a predetermined period, for example. If the detected movement path coincides with the movement path of the carrier robot 29, the central processing unit 13 denies a fall of an object at step T3. The processing of the central processing unit 13 is then completed.

If the detected movement path deviates from the movement path of the carrier robot 29, the central processing unit 13 determines a fall of an unidentified object at step T3. The central processing unit 13 operates to stop the carrier robot 29 based on the monitoring apparatus controlling application 17 at step T4. The process of the backup utility 17 is interrupted. The controller 36 of the magnetic tape library apparatus 21 stops the operation of the carrier robot 29.

The central processing unit 13 then instructs the CCD camera 41 of the monitoring apparatus unit 37 to capture an image at step T5. The central processing unit 13 of the backup server 12 is allowed to collect the image data signals sent from the individual monitoring apparatus units 37. The central processing unit 13 determines at step T6 whether or not the central processing unit 13 has received all the required information. If not completed, the central processing unit 13 operates to allow capture of images again at step T5. If done, the processing of the central processing unit 13 advances to step T7.

The central processing unit 13 implements an image analysis on image data included in the image information signal at step T7 in the aforementioned manner. The image analysis is utilized to determine whether or not the magnetic tape cartridges 28 exist in the cells. If it is confirmed that the magnetic tape cartridge or cartridges 28 exists in the cell or cells corresponding to the registered position or positions, the processing of the central processing unit 13 advances to step T8. The central processing unit 13 implements the fault notifying application 18 at step T8. The maintenance service center 24 is in this manner notified of the fact that a drop of the magnetic tape cartridge 28 did not happen. When the notification is in this manner completed, the central processing unit 13 cancels the stoppage of the carrier robot 29 at step T9. The magnetic tape library apparatus 21 resumes the normal operation of the backup utility 16.

If the image analysis reveals that the magnetic tape cartridge 28 has been lost, the central processing unit 13 determines a fall of the magnetic tape cartridge 28. The central processing unit 13 then implements the fault notifying application 18 at step T10. The maintenance service center 24 is in this manner notified of a fall of the magnetic tape cartridge 28 out of a cell. A maintenance or service person is allowed to rush for the maintenance activity on the magnetic tape library apparatus 21 in response to the notification.

Movement of an object may also be monitored while the backup utility 16 is suspended. In this case, when the monitoring apparatus unit 37 detects the movement of an unidentified object, the central processing unit 13 automatically instructs the CCD camera 41 to capture images. The captured images are expected to contribute to identification of a person in charge of steal of the magnetic tape cartridge 28, for example.

Now, assume that the enclosure 22 suffers from rise above a predetermined threshold in the temperature and/or humidity inside the enclosure 22. The temperature/humidity sensor 53 detects the rise in the temperature and humidity. The temperature/humidity sensor controller 54 correspondingly generates the temperature information signal and/or the humidity information signal. The controller 57 assembles a data signal based on the temperature information signal and/or the humidity information signal and the identification information data in the same manner as described above. The data signal is transmitted from the antenna 56 to the access point of the wireless LAN 25. The data signal is transferred through the network 26 into the backup server 12.

The central processing unit 13 of the backup server 12 implements the fault notifying application 18 based on the execution of the monitoring apparatus controlling application 17. The maintenance service center 24 is in this manner notified of the fact that the temperature or/and humidity excessively has risen in the enclosure 22. A maintenance or service person is allowed to rush for the maintenance activity on the magnetic tape library apparatus 21 in response to the notification. Otherwise, the notification may be utilized in controlling an air conditioner in the room or building accommodating the magnetic tape library apparatus 21. The threshold of the temperature and humidity may depend on the maximum acceptable temperature and humidity for the magnetic tape cartridge 28.

Now, assume that the battery 59 suffers from less capacity in the monitoring apparatus unit 37 during the execution of the monitoring apparatus controlling application 17. The residual capacity sensor 61 detects a reduced capacity in the battery 59. The residual capacity sensor 61 transmits the notification signal in the aforementioned manner. The controller 27 assembles a data signal based on the notification signal and the identification information data in the same manner as described above. The data signal is transmitted from the antenna 56 to the access point of the wireless LAN 25. The data signal is transferred through the network 26 into the backup server 12.

The central processing unit 13 of the backup server 12 instructs the carrier robot 29 to transfer one of the monitoring apparatus units 37 based on the monitoring apparatus controlling application 17. The position of the monitoring apparatus unit 37 can be detected based on the identification information data included in the data signal, for example. The carrier robot 29 transfers the target monitoring apparatus unit 37 into the cell adjacent to the battery charger 38.

The central processing unit 13 of the backup server 12 then instructs the battery charger 38 to charge up the battery 59 based on the monitoring apparatus controlling application 17. The controller 65 of the battery charger 38 extracts by air the cartridge type data from the RF memory 58 in the monitoring apparatus unit 37 prior to start of the charge. The type of the cartridge is in this manner confirmed. The battery charger 38 starts charging up the battery 59. The battery 59 is thus electrified. Since the type of the cartridge has been checked when the battery charger 38 starts charging up the battery 59, the magnetic tape cartridge 28 erroneously installed in the cell adjacent the battery charger 38 is reliably prevented from exposure to the irradiation of the electromagnetic wave. The magnetic tape cartridge 28 is sufficiently protected from electromagnetic waves.

Figure 7:
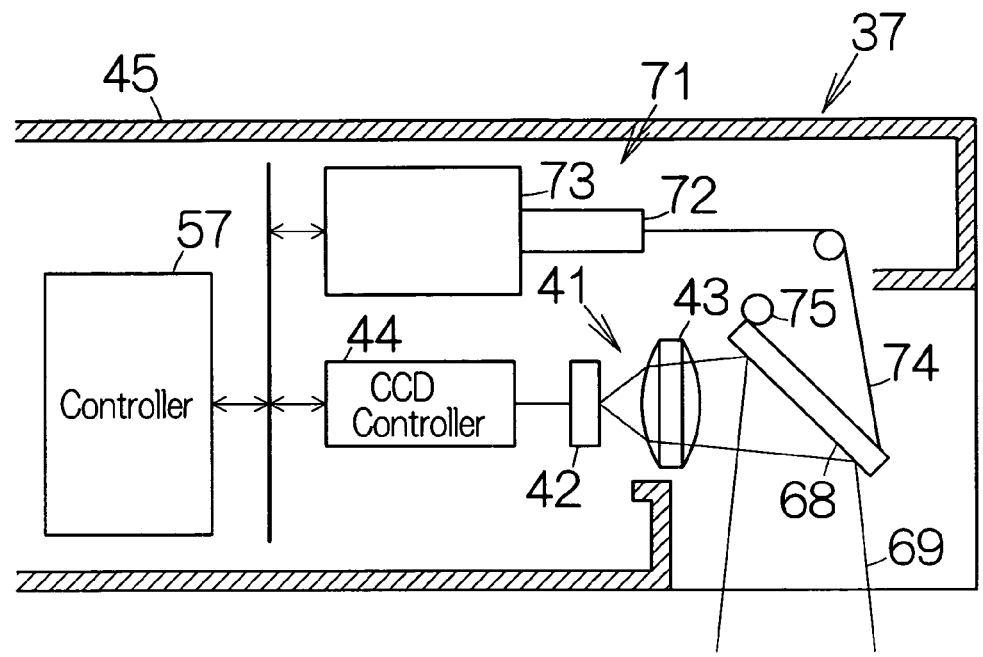
FIG. 7 is an enlarged partial schematic view of a monitoring apparatus unit according to a modification.
Figure 8:
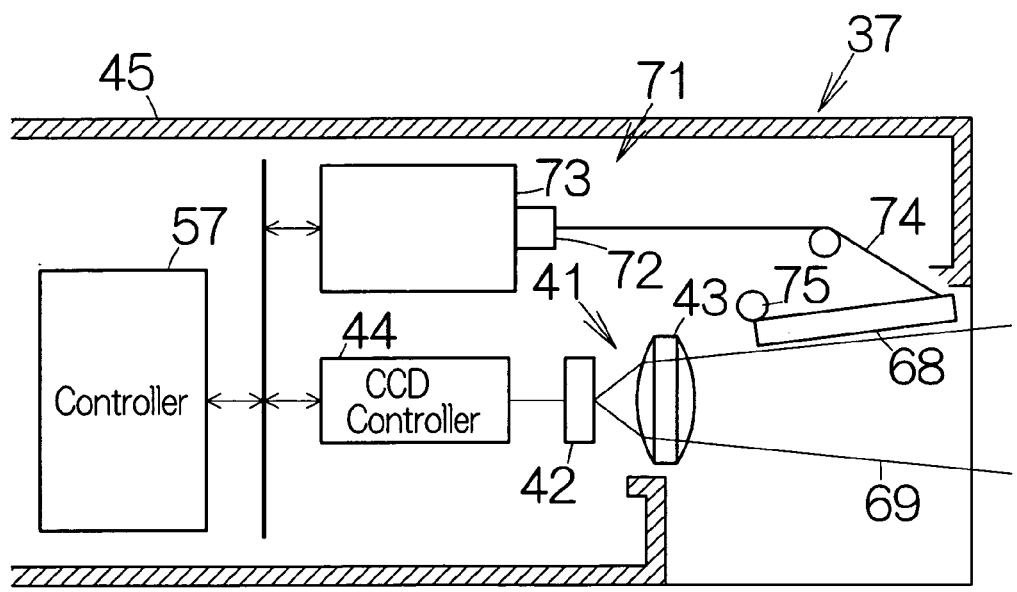
FIG. 8 is an enlarged partial schematic view illustrating the action of the monitoring apparatus unit according to the modification.

For example, when the maintenance service center 24 has been notified of a fall of the magnetic tape cartridge 28, a maintenance or service person may instruct the monitoring apparatus units 37 to collect further information on a detailed situation. The monitoring apparatus units 37 thus operate to capture images of the inside of the enclosure 22 again in response to this instruction. In this case, a mirror 68 may be placed on the optical axis of the optical lens 43, as shown in FIG. 7. The reflection of the mirror 68 is utilized to realize refraction of the optical axis of the optical lens 43. The CCD camera 41 is allowed to capture images over an extended range 69. Detailed images of the inside of the enclosure 22 can be captured. An angle adjustment mechanism 71 may be connected to the mirror 68. An electromagnetic solenoid 73 may be incorporated in the angle adjustment mechanism 71. The electromagnetic solenoid 73 serves to establish electromagnetic force forcing a pin 72 to protrude from and withdraw into the electromagnetic solenoid 73. A metallic wire 74 may be employed to connect the pin 72 of the electromagnetic solenoid 73 to the mirror 68, for example. The base end of the mirror 68 is coupled to a rotation shaft 75. The tip end of the mirror 68 is thus allowed to swing around the rotation shaft 75 with the assistance of the metallic wire 74. When the supply of electric current to the electromagnetic solenoid 73 is cut off, the gravity acts on the mirror 68 so as to place the mirror 68 on the optical axis of the optical lens 43 around the rotation shaft 75. When electric current is supplied to the electromagnetic solenoid 73, as shown in FIG. 8, the pin 72 retreats into the solenoid 73. The wire 73 is thus pulled toward the electromagnetic solenoid 73, so that the mirror 68 is withdrawn from the space above the optical axis of the optical lens 43 around the rotation shaft 75. The refraction of the optical axis of the optical lens 43 is in this manner canceled. The CCD camera 41 is thus allowed to capture images over a set range. The electromagnetic solenoid 73 may be controlled based on instruction signals supplied from the controller 57.

Figure 9:
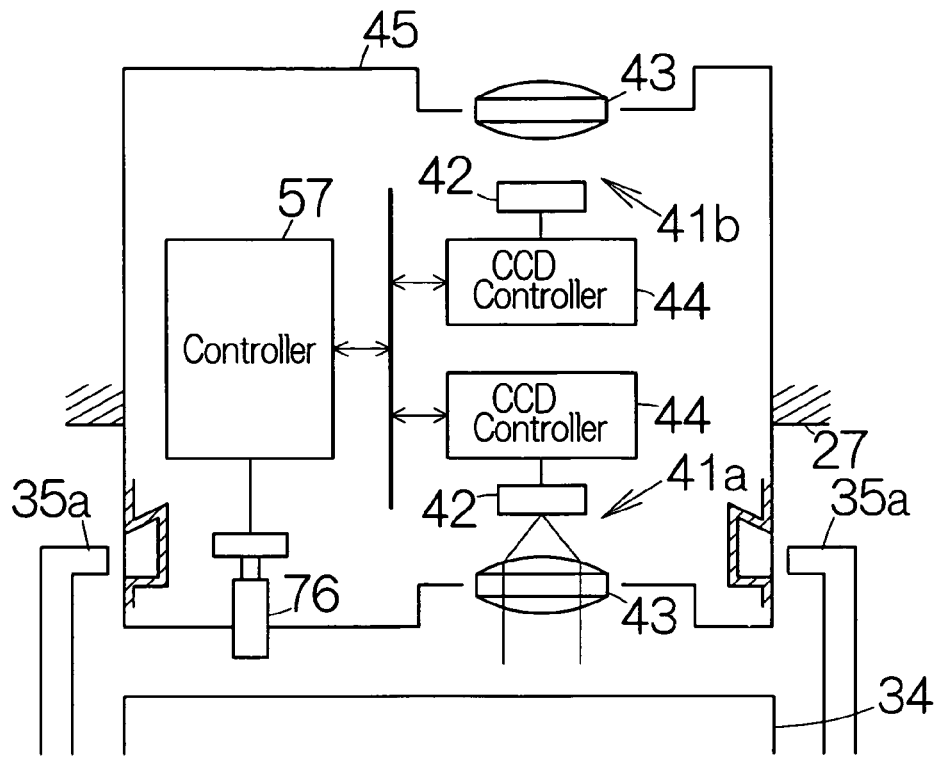
FIG. 9 is an enlarged partial schematic view illustrating a monitoring apparatus unit according another modification.
Figure 10:
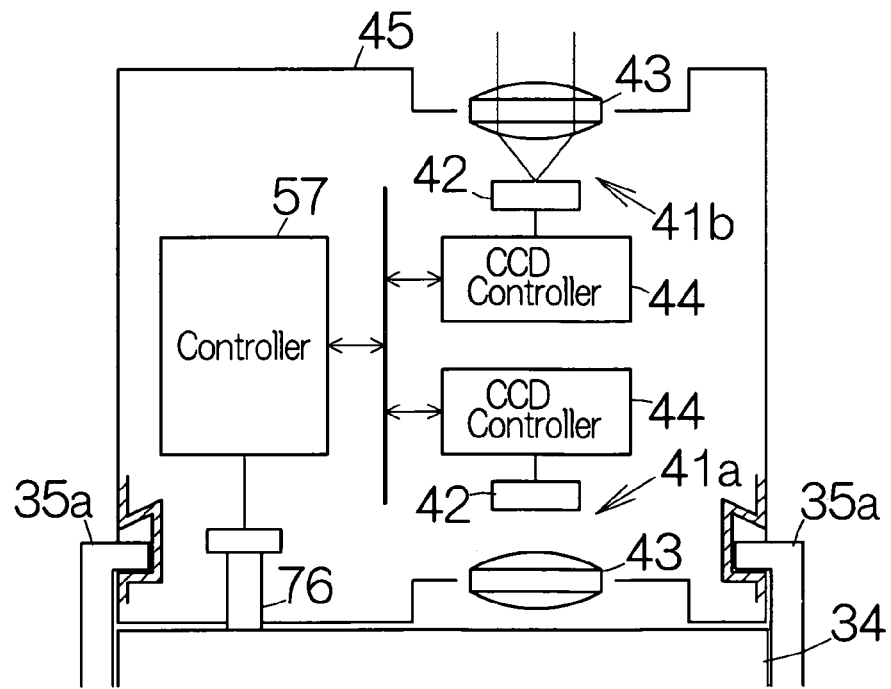
FIG. 10 is an enlarged partial schematic view illustrating the action of the monitoring apparatus according to another modification.

As shown in FIG. 9, first and second CCD cameras 41a, 41b may be placed within the cartridge casing 45 of the monitoring apparatus unit 37. As is apparent from FIG. 9, the first CCD camera 41a includes an image sensor or first CCD 42. A first optical lens 43 is related to the first CCD 42. The first optical lens 43 serves to lead an image of an object to the first CCD 42 in a first direction for focusing the image on the first CCD 42. Likewise, the second CCD camera 41b includes an image sensor or second CCD 42. A second optical lens 43 is related to the second CCD 42. The second optical lens 43 serves to lead an image of an object to the second CCD 42 in a second direction opposite to the first direction for focusing the image on the second CCD 42. The controller 57 is capable of switching over the first and second CCD cameras 41a, 41b so as to capture images. A contact switch 76 is attached to the cartridge casing 45 for switching over the first and second CCD cameras 41a, 41b. The contact switch 76 is capable of detecting an object contacted with the cartridge casing 45 in the first direction.

When this type of monitoring apparatus unit 37 is placed in the cell of the storage cabinets 27, the optical lens 34 of the first CCD camera 41a faces outside from the opening of the cell. Any object fails to touch the contact switch 76. The contact switch 76 is kept released. The controller 57 thus instructs the first CCD camera 41a to capture images. The first CCD camera 41a of the monitoring apparatus unit 37 held within the cell is allowed to capture images on the cells at positions opposed to the monitoring apparatus unit 37 in the cell.

Now, assume that the hand 34 of the carrier robot 29 holds the monitoring apparatus units 37. The monitoring apparatus unit 37 is caught between the claws 35a. The monitoring apparatus unit 37 is then pulled back toward the hand 34. The hand 34 thus touches the contact switch 76, so that the contact switch 76 is pushed. The contact switch 76 supplies the detection signal to the controller 57.

The controller 57 chooses the second CCD camera 41b in response to the supplied detection signal. The second CCD camera 41b is instructed to capture images. When the monitoring apparatus unit 37 is withdrawn from the cell, the optical lens 43 of the second CCD camera 41b captures images of the storage cabinet 27. The second CCD camera 41b in the monitoring apparatus unit 37 held on the hand 34 captures images of the cells at positions opposed to the second CCD camera 41b. This second CCD camera 42b is capable of capturing various images based on the rotation of the hand 34, the horizontal movement of the mobile unit 33, and the vertical movement of the horizontal rail 31. This enables a detailed observation inside the enclosure 22 than ever.

What is claimed is:
1. A library apparatus comprising:
an enclosure enclosing at least one storage cabinet, the storage cabinet defining a plurality of cells;

a plurality of recording cartridges, each of the recording cartridges including a recording medium and having a shape designed to be contained in one of the cells;

at least one monitoring cartridge having a shape identical to the shape of the recording cartridge and containing a sound sensor detecting sound corresponding to an impact of the recording cartridge.

2. The library apparatus according to claim 1, wherein the monitoring cartridge includes:

a memory holding type data specifying a type of the monitoring cartridge;

a storage battery incorporated in the cartridge;

a battery charger supplying electricity to the storage battery based on electromagnetic induction; and a controller incorporated in the battery charger, said controller obtaining the type data from the memory unit.

3. The library apparatus according to claim 1, further comprising:

a carrier robot designed to move in the enclosure so as to transfer one cartridge selected from the recording cartridges and the monitoring cartridge from a cell to another cell, wherein the monitoring cartridge includes a sensor controller removing a sound of a movement of the carrier robot from a detected sound by the sound sensor, determining a volume level of the detected sound after removal of the sound of the movement of the carrier robot, and generating a notification signal when the volume level exceeds a predetermined volume level.

4. A method of controlling a library apparatus, comprising:

detecting sound generated by a collision of a cartridge in an enclosure of the library apparatus; and determining a fall of a cartridge from a storage cabinet in the enclosure based on the sound.

5. The method according to claim 4, further comprising capturing an image of an inside of the enclosure in response to the fall of the cartridge.

6. The method according to claim 4, wherein the library apparatus includes a plurality of cartridges placed in the storage cabinet, and a carrier robot designed to move in the enclosure so as to transfer a select one of the cartridges from a position to another position in the storage cabinet, the method further comprises:

removing a sound of a movement of the carrier robot from the detected sound;

determining a volume level of the detected sound after removal of the sound of the movement of the carrier robot;

comparing a frequency distribution of the sound after the removal with a predetermined frequency distribution when the volume level exceeds a predetermined volume level; and stopping movement of the carrier robot when the fall of the cartridge is determined based on the comparison.

7. A cartridge for a library apparatus, the library apparatus including an enclosure containing a storage cabinet, and a carrier robot designed to move in the enclosure so as to transfer a select cartridge from a position to another position in the storage cabinet, the cartridge comprising:

a cartridge casing;

a sound sensor enclosed within the cartridge casing, said sound sensor detecting sound generated within the enclosure of the library apparatus; and a sensor controller enclosed within the cartridge casing and designed to remove a sound of a movement of the carrier robot from a detected sound detected by the sound sensor, to determine a volume level of the detected sound after removal of the sound of the movement of the carrier robot from the detected sound, and to generate a notification signal when the volume level exceeds a predetermined volume level.

8. The cartridge according to claim 7, further comprising a controller enclosed within the cartridge casing and connected to the sound sensor, the controller designed to detect an abnormal sound based on the sound detected at the sound sensor.

9. A library apparatus comprising:

an enclosure enclosing at least one storage cabinet, the storage cabinet defining a plurality of cells;

a plurality of recording cartridges, each of the recording cartridges including a recording medium and having a shape designed to be contained in one of the cells; and at least one monitoring cartridge having a shape identical to the shape of the recording cartridge and including an ultrasonic sensor and an ultrasonic sensor controller, wherein the ultrasonic sensor is designed to transmit an ultrasonic and to detect movement of an object within the enclosure based on the ultrasonic reflected from the object, and the ultrasonic sensor controller generates a movement information signal specifying the movement of the object based on the detected movement of the object.

10. A cartridge for a library apparatus, the library apparatus including an enclosure containing a storage cabinet, and a carrier robot designed to move in the enclosure so as to transfer a select cartridge from a position to another position in the storage cabinet, the cartridge comprising:

a cartridge casing;

an ultrasonic sensor located inside the cartridge casing, said ultrasonic sensor transmitting an ultrasonic and detecting movement of an object within an enclosure of the library apparatus based on the ultrasonic reflected from the object; and an ultrasonic sensor controller generates a movement information signal specifying the movement of the object based on a detected movement of the object.

11. The cartridge according to claim 10, wherein the ultrasonic sensor comprises:

an ultrasonic oscillator transmitting the ultrasonic; and a receiving element receiving the ultrasonic reflected from the object.

12. A method of controlling a library apparatus, comprising:

detecting movement of an object in an enclosure of the library apparatus based on reflection of an ultrasonic; and capturing an image of an inside of the enclosure based on the movement of the object.

13. The method according to claim 12, wherein the library apparatus includes: an enclosure containing a storage cabinet; a plurality of cartridges placed in the storage cabinet; and a carrier robot designed to move in the enclosure so as to transfer select one of the cartridges from a position to another position in the storage cabinet, the method further includes:

comparing the detected movement of the subject with a movement of the carrier robot, the movement of the carrier robot being designated by data stored in a memory; and stopping movement of the carrier robot when the detected movement of the object deviates from the stored movement of the carrier robot, wherein:

the movement of the object is detected based on the reflection of an ultrasonic from the object, and the image of the inside of the enclosure is captured after the stoppage of the carrier robot.

14. A cartridge for a library apparatus, comprising:

a cartridge casing having a shape capable of being contained in one of a plurality of cells defined in a storage cabinet in the library apparatus;

an image sensor located inside the cartridge casing;

an optical lens establishing an imaging of an object on the image sensor; and a mirror designed to move between first and second positions, said first position being defined on an optical axis of the optical lens so that the optical axis extends in a first direction, said second position being defined at a position retreating from the optical axis of the optical lens so that the optical axis extends in a second direction; and an angle adjustment mechanism connected to the mirror, the angle adjustment mechanism moving the mirror between the first and second positions so that the image sensor is allowed to capture an image along the optical axis extending in the first direction while the cartridge casing is contained in the cell, and to capture an image along the optical axis extending in the second direction while the cartridge casing is contained in the cell.

15. A cartridge for a library apparatus, comprising:

a cartridge casing;

first and second image sensors located inside the cartridge casing;

a first optical lens leading an image of an object to the first image sensor in a first direction;

a second optical lens leading an image of an object to the second image sensor in a second direction opposite to the first direction; and a switch attached to the cartridge casing and coupled to the first and second image sensors, said switch designed to select one of the first and second image sensors so as to capture images.

16. The cartridge according to claim 15, further comprising a controller designed to detect an object approaching the cartridge casing in the first direction.

17. The cartridge according to claim 15, wherein:

the library apparatus includes a storage cabinet and a carrier robot designed to hold the cartridge casing so as to transfer the cartridges from a position to another position in the storage cabinet, and the switch detects holding of the cartridge casing by the carrier robot as to select one of the first and second image sensors, and detects release of the cartridge casing from the carrier robot so as to select one of the first and second image sensors.

* * * * *